US009257113B2

(12) United States Patent
Ni et al.

(10) Patent No.: US 9,257,113 B2
(45) Date of Patent: Feb. 9, 2016

(54) METHOD AND SYSTEM FOR ACTIVE NOISE CANCELLATION

(71) Applicant: Texas Instruments Incorporated, Dallas, TX (US)

(72) Inventors: Chuan Ni, Plano, TX (US); Yunhong Li, Santa Clara, CA (US); Long Yin Chen, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 173 days.

(21) Appl. No.: 14/010,667

(22) Filed: Aug. 27, 2013

(65) Prior Publication Data

US 2015/0063583 A1 Mar. 5, 2015

(51) Int. Cl.
*G01K 11/00* (2006.01)
*G10K 11/178* (2006.01)

(52) U.S. Cl.
CPC ...... *G10K 11/1786* (2013.01); *G10K 2210/108* (2013.01); *G10K 2210/111* (2013.01); *G10K 2210/3046* (2013.01)

(58) Field of Classification Search
None
See application file for complete search history.

(56) References Cited

U.S. PATENT DOCUMENTS

| | | | | |
|---|---|---|---|---|
| 4,736,431 | A * | 4/1988 | Allie et al. | 381/71.8 |
| 5,699,437 | A * | 12/1997 | Finn | 381/71.7 |
| 8,396,233 | B2 | 3/2013 | Ma et al. | |
| 8,542,843 | B2 * | 9/2013 | Andrea et al. | 381/71.11 |
| 2006/0153360 | A1 * | 7/2006 | Kellermann et al. | 379/406.08 |
| 2007/0081677 | A1 * | 4/2007 | Nishikawa | 381/98 |
| 2008/0165979 | A1 * | 7/2008 | Takumai | 381/59 |
| 2008/0304677 | A1 * | 12/2008 | Abolfathi et al. | 381/71.1 |
| 2009/0003634 | A1 * | 1/2009 | Kushida | 381/300 |
| 2012/0093348 | A1 | 4/2012 | Li | |
| 2012/0121113 | A1 | 5/2012 | Li | |
| 2015/0063583 | A1 * | 3/2015 | Ni et al. | 381/71.6 |

* cited by examiner

*Primary Examiner* — Peter Vincent Agustin
(74) *Attorney, Agent, or Firm* — Michael A. Davis, Jr.; Frank D. Cimino

(57) ABSTRACT

From at least a first microphone, first microphone signals are received that represent first sound waves. From at least a second microphone, second microphone signals are received that represent second sound waves. In response to the first microphone signals, first noise in the first sound waves is estimated, and first cancellation signals are output for causing a speaker array to generate first additional sound waves via at least a first acoustic beam for cancelling at least some of the first noise. In response to the second microphone signals, second noise in the second sound waves is estimated, and second cancellation signals are output for causing the speaker array to generate second additional sound waves via at least a second acoustic beam for cancelling at least some of the second noise.

18 Claims, 3 Drawing Sheets

METHOD AND SYSTEM FOR ACTIVE NOISE CANCELLATION

BACKGROUND

The disclosures herein relate in general to audio signal processing, and in particular to a method and system for active noise cancellation.

A user may hear noise from a surrounding environment. A mechanical structure can attempt to physically buffer the user's ears against some of the noise, but the mechanical structure has limits. In addition to the mechanical structure, an active noise cancellation system can attempt to generate signals for cancelling at least some of the noise. Nevertheless, different techniques for active noise cancellation have respective shortcomings and trade-offs.

SUMMARY

From at least a first microphone, first microphone signals are received that represent first sound waves. From at least a second microphone, second microphone signals are received that represent second sound waves. In response to the first microphone signals, first noise in the first sound waves is estimated, and first cancellation signals are output for causing a speaker array to generate first additional sound waves via at least a first acoustic beam for cancelling at least some of the first noise. In response to the second microphone signals, second noise in the second sound waves is estimated, and second cancellation signals are output for causing the speaker array to generate second additional sound waves via at least a second acoustic beam for cancelling at least some of the second noise.

DETAILED DESCRIPTION

Figure 1:
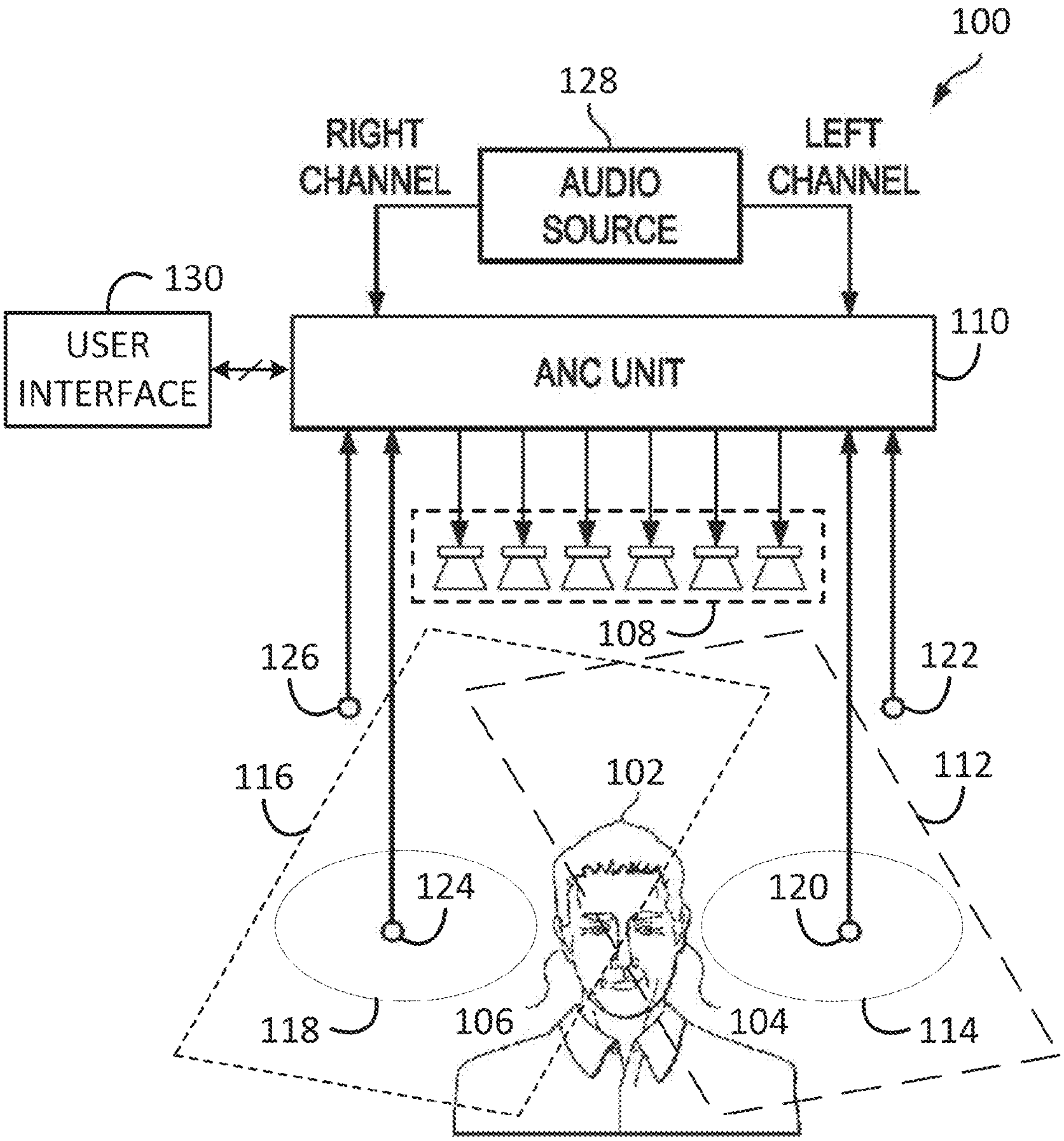
FIG. 1 is a block diagram of a system of the illustrative embodiments.

FIG. 1 is a block diagram of a system, indicated generally at 100, of the illustrative embodiments. A human user 102 has a left ear 104 and a right ear 106 for hearing. The system 100 includes an array 108 of speakers for generating sound waves.

The array 108 is suitable for acoustic beam forming. Examples of acoustic beam forming are described in co-owned U.S. Patent Application Publication No. 2012/0093348, co-owned U.S. Patent Application Publication No. 2012/0121113, and co-owned U.S. Pat. No. 8,396,233, which are hereby fully incorporated herein by reference. Accordingly, in response to signals from an active noise cancellation ("ANC") unit 110, the array 108 generates: (a) at least a first acoustic beam through a region 112, so that at least first sound waves exist within an environment 114 (which is part of the region 112) around the ear 104; and (b) at least a second acoustic beam through a region 116, so that at least second sound waves (distinct from the first sound waves) exist within an environment 118 (which is part of the region 116) around the ear 106.

In the example of FIG. 1, an error microphone 120 is located within the environment 114, and a reference microphone 122 is located outside the region 112. The error microphone 120: (a) converts, into signals, sound waves from the environment 114 (e.g., including sound waves of at least the first acoustic beam from the array 108); and (b) outputs those signals. The reference microphone 122: (a) converts, into signals, sound waves from outside the region 112 (e.g., ambient noise around the reference microphone 122); and (b) outputs those signals.

Similarly, an error microphone 124 is located within the environment 118, and a reference microphone 126 is located outside the region 116. The error microphone 124: (a) converts, into signals, sound waves from the environment 118 (e.g., including sound waves of at least the second acoustic beam from the array 108); and (b) outputs those signals. The reference microphone 126: (a) converts, into signals, sound waves from outside the region 116 (e.g., ambient noise around the reference microphone 126); and (b) outputs those signals.

Accordingly, the signals from the error microphone 120 and the reference microphone 122 represent various sound waves ("first sounds"). The ANC unit 110: (a) receives and processes the signals from the error microphone 120 and the reference microphone 122; and (b) in response thereto, outputs signals for causing the array 108 to generate first additional sound waves (via at least the first acoustic beam) that cancel at least some noise in those first sounds.

Similarly, the signals from the error microphone 124 and the reference microphone 126 represent various sound waves ("second sounds"). The ANC unit 110: (a) receives and processes the signals from the error microphone 124 and the reference microphone 126; and (b) in response thereto, outputs signals for causing the array 108 to generate second additional sound waves (via at least the second acoustic beam) that cancel at least some noise in those second sounds.

In one example, the ANC unit 110 optionally: (a) receives audio signals from a left channel of an audio source 128 ("left audio"); and (b) combines the left audio into the first signals that the ANC unit 110 outputs to the array 108. Accordingly, in this example: (a) the array 108 generates the first additional sound waves to also represent the left audio's information (e.g., music and/or speech), which is audible to the ear 104 via at least the first acoustic beam; and (b) the ANC unit 110 suitably accounts for the left audio in its further processing (e.g., estimating noise) of the signals from the error microphone 120 for cancelling at least some noise in those sound waves.

Similarly, the ANC unit 110 optionally: (a) receives audio signals from a right channel of the audio source 128 ("right audio"); and (b) combines the right audio into the second signals that the ANC unit 110 outputs to the array 108. Accordingly, in this example: (a) the array 108 generates the second additional sound waves to also represent the right audio's information (e.g., music and/or speech), which is audible to the ear 106 via at least the second acoustic beam; and (b) the ANC unit 110 suitably accounts for the right audio in its further processing (e.g., estimating noise) of the signals from the error microphone 124 for cancelling at least some noise in those sound waves.

In one embodiment, a user interface 130 is a touchscreen, such as: (a) a liquid crystal display ("LCD") device; and (b) touch-sensitive circuitry of such LCD device, so that the touch-sensitive circuitry is integral with such LCD device. In such embodiment, the user 102 operates the touchscreen (e.g., virtual keys thereof, such as a virtual keyboard and/or virtual keypad) for: (a) viewing information (e.g., alphanumeric text information) from the ANC unit 110; and (b) specifying information to the ANC unit 110, which receives that user-specified information from the touchscreen and operates in response thereto. Accordingly, the user 102 operates the user interface 130 to control various operations of the ANC unit 110.

Although FIG. 1 shows six (6) speakers in the array 108, an exact number and positioning of those speakers is variable in the illustrative embodiments. Further, although FIG. 1 shows two (2) microphones 120 and 122 on a left side of the user 102, an exact number and positioning of those microphones on the left side of the user 102 is variable in the illustrative embodiments. Similarly, although FIG. 1 shows two (2) microphones 124 and 126 on a right side of the user 102, an exact number and positioning of those microphones on the right side of the user 102 is variable in the illustrative embodiments.

Figure 2:
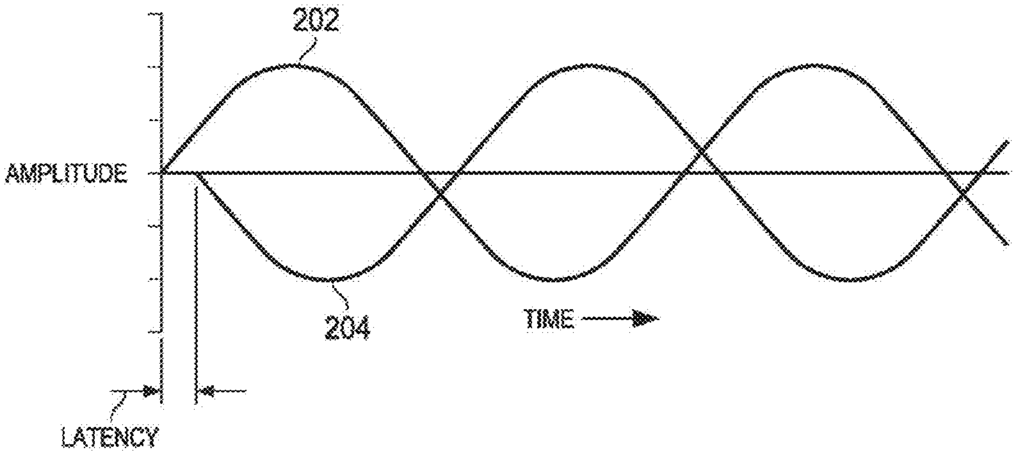
FIG. 2 is a graph of an example noise signal and an example noise cancellation signal.

FIG. 2 is a graph of: (a) an example noise signal 202, such as a signal from the error microphone 120 or the reference microphone 122; and (b) an example noise cancellation signal 204, such as a signal from the ANC unit 110 to the array 108 for at least the first acoustic beam. As shown in FIG. 2, the signal 204 is substantially inverted from the signal 202, so that a phase of the signal 204 is shifted (relative to a phase of the signal 202) by ~180 degrees (e.g., 180 degrees plus a latency) across a bandwidth of the signals 202 and 204. For example, the latency may result from a processing cycle of the ANC unit 110. In this manner, the signal 204 is effective for cancelling at least some noise in a sound wave that is represented by the signal 202.

Figure 3:
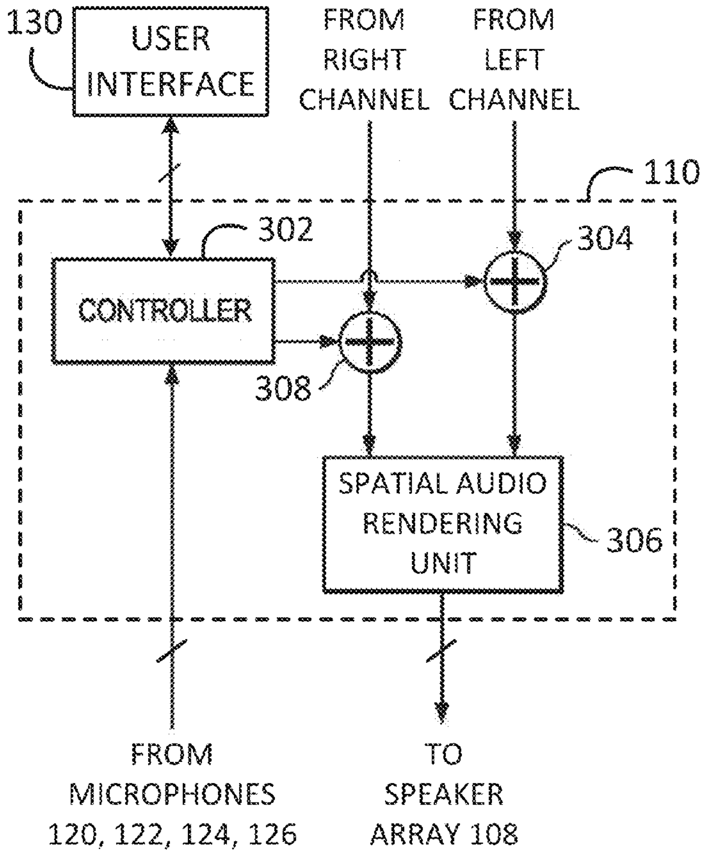
FIG. 3 is a block diagram of an active noise cancellation unit of FIG. 1.

FIG. 3 is a block diagram of the ANC unit 110. As shown in FIG. 3, the ANC unit 110 includes a controller 302 (e.g., a feed-forward controller and/or a feedback controller). The microphones 120, 122, 124 and 126 are connected to the controller 302, which: (a) receives the signals that are output from those microphones in response to sound waves on the left and right sides of the user 102; (b) in response to those signals, estimates noise in those sound waves; (c) generates first signals for cancelling at least some of the estimated noise in those sound waves on the left side of the user 102 ("first noise cancellation signals"); and (d) generates second signals for cancelling at least some of the estimated noise in those sound waves on the right side of the user 102 ("second noise cancellation signals").

A mixer 304: (a) combines the first noise cancellation signals and the left audio (which the ANC unit 110 receives from the left channel of the audio source 128); and (b) outputs those combined signals to a spatial audio rendering unit 306. Similarly, a mixer 308: (a) combines the second noise cancellation signals and the right audio (which the ANC unit 110 receives from the right channel of the audio source 128); and (b) outputs those combined signals to the spatial audio rendering unit 306. In response to those signals from the mixers 304 and 308, the spatial audio rendering unit 306 causes the array 108 to generate the first and second acoustic beams through the regions 112 and 116, respectively.

For clarity, although FIG. 3 shows the user interface 130 connected to only the controller 302, the user interface 130 is further coupled to the spatial audio rendering unit 306. The controller 302 and the spatial audio rendering unit 306 receive the user-specified information from the user interface 130 and operate in response thereto. Accordingly, the user 102 operates the user interface 130 to control various operations of the controller 302 and the spatial audio rendering unit 306. For example, in response to the user-specified information: (a) the spatial audio rendering unit 306 causes the array 108 to generate the first and second acoustic beams in shapes and/or directions specified by the user 102; and (b) the controller 302 identifies a number and positioning of microphones on the left and right sides of the user 102 (as specified by the user 102), so that the controller 302 suitably performs its estimation of noise (and its generation of the first and second noise cancellation signals) in response to such number and positioning.

Figure 4:
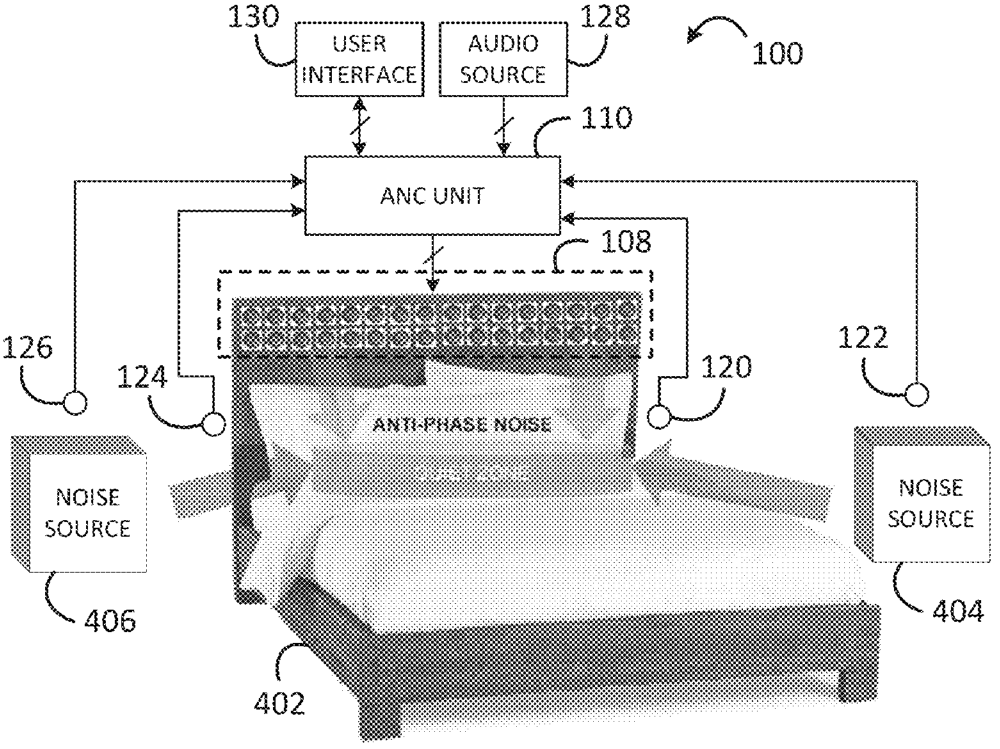
FIG. 4 is a diagram of an example implementation of the system of FIG. 1.

FIG. 4 is a diagram of an example implementation of the system 100, in which the array 108 is integral with a headboard of a bed 402. Although FIG. 4 is not drawn to scale, it shows one example positioning of the microphones 120, 122, 124 and 126 relative to the bed 402, and relative to noise sources 404 and 406. In response to the user-specified information from the user interface 130, the ANC unit 110 causes the array 108 to generate the first and second acoustic beams in shapes and/or directions specified by the user 102.

As discussed hereinabove in connection with FIG. 1, the first and second acoustic beams include the first and second additional sound waves (collectively "anti-phase noise"), respectively. In this example, the anti-phase noise cancels at least some noise in a "quiet zone" near pillows of the bed 402, as shown in FIG. 4. Accordingly, if a head of the user 102 is located in the "quiet zone," then the system 100 enables the user 102 to rest (e.g., sleep) more easily with less noise around the ears 104 and 106.

Although illustrative embodiments have been shown and described by way of example, a wide range of alternative embodiments is possible within the scope of the foregoing disclosure.

What is claimed is:

1. A method performed by at least one device for active noise cancellation, the method comprising:

from at least a first microphone, receiving first microphone signals that represent first sound waves;

from at least a second microphone, receiving second microphone signals that represent second sound waves;

in response to the first microphone signals, estimating first noise in the first sound waves, and outputting first cancellation signals for causing a speaker array to generate first additional sound waves via at least a first acoustic beam for cancelling at least some of the first noise; and in response to the second microphone signals, estimating second noise in the second sound waves, and outputting second cancellation signals for causing the speaker array to generate second additional sound waves via at least a second acoustic beam for cancelling at least some of the second noise;

wherein the first microphone is located within a first environment around a first ear, and wherein the second microphone is located within a second environment around a second ear, so that the first sound waves are from the first environment, and the second sound waves are from the second environment.

2. The method of claim 1, wherein the first ear and the first microphone are located within a first region of the first acoustic beam, and wherein the second ear and the second microphone are located within a second region of the second acoustic beam.

3. The method of claim 1, wherein the first microphone is located outside a first region of the first acoustic beam, and wherein the second microphone is located outside a second region of the second acoustic beam.

4. The method of claim 1, wherein the first additional sound waves are distinct from the second additional sound waves.

5. A method performed by at least one device for active noise cancellation the method comprising:

from at least a first microphone, receiving first microphone signals that represent first sound waves;

from at least a second microphone, receiving second microphone signals that represent second sound waves;

in response to the first microphone signals, estimating first noise in the first sound waves, and outputting first cancellation signals for causing a speaker array to generate first additional sound waves via at least a first acoustic beam for cancelling at least some of the first noise;

in response to the second microphone signals, estimating second noise in the second sound waves, and outputting second cancellation signals for causing the speaker array to generate second additional sound waves via at least a second acoustic beam for cancelling at least some of the second noise;

receiving first audio signals from a first channel of an audio source;

receiving second audio signals from a second channel of the audio source;

combining the first audio signals into the first cancellation signals for causing the speaker array to generate the first additional sound waves via at least the first acoustic beam, so that the first additional sound waves also represent information of the first audio signals; and combining the second audio signals into the second cancellation signals for causing the speaker array to generate the second additional sound waves via at least the second acoustic beam, so that the second additional sound waves also represent information of the second audio signals.

6. A method performed by at least one device for active noise cancellation, the method comprising:

from at least a first microphone located within a first environment around a first ear, receiving first microphone signals that represent first sound waves from the first environment;

from at least a second microphone located within a second environment around a second ear, receiving second microphone signals that represent second sound waves from the second environment;

from at least a third microphone located outside a first region of a first acoustic beam, receiving third microphone signals that represent third sound waves from outside the first region;

from at least a fourth microphone located outside a second region of a second acoustic beam, receiving fourth microphone signals that represent fourth sound waves from outside the second region;

in response to the first and third microphone signals, estimating first noise in the first and third sound waves, and outputting first cancellation signals for causing a speaker array to generate first additional sound waves via at least the first acoustic beam for cancelling at least some of the first noise, wherein the first ear and the first microphone are located within the first region of the first acoustic beam; and in response to the second and fourth microphone signals, estimating second noise in the second and fourth sound waves, and outputting second cancellation signals for causing the speaker array to generate second additional sound waves via at least the second acoustic beam for cancelling at least some of the second noise, wherein the second ear and the second microphone are located within the second region of the second acoustic beam.

7. The method of claim 6, wherein the first additional sound waves are distinct from the second additional sound waves.

8. The method of claim 6, and comprising:

receiving first audio signals from a first channel of an audio source;

receiving second audio signals from a second channel of the audio source;

combining the first audio signals into the first cancellation signals for causing the speaker array to generate the first additional sound waves via at least the first acoustic beam, so that the first additional sound waves also represent information of the first audio signals; and combining the second audio signals into the second cancellation signals for causing the speaker array to generate the second additional sound waves via at least the second acoustic beam, so that the second additional sound waves also represent information of the second audio signals.

9. The method of claim 6, wherein the speaker array is integral with a headboard of a bed.

10. A system for active noise cancellation, the system comprising:

at least one device for: from at least a first microphone, receiving first microphone signals that represent first sound waves; from at least a second microphone, receiving second microphone signals that represent second sound waves; in response to the first microphone signals, estimating first noise in the first sound waves, and outputting first cancellation signals for causing a speaker array to generate first additional sound waves via at least a first acoustic beam for cancelling at least some of the first noise; and, in response to the second microphone signals, estimating second noise in the second sound waves, and outputting second cancellation signals for causing the speaker array to generate second additional sound waves via at least a second acoustic beam for cancelling at least some of the second noise;

wherein the first microphone is located within a first environment around a first ear, and wherein the second microphone is located within a second environment around a second ear, so that the first sound waves are from the first environment, and the second sound waves are from the second environment.

11. The system of claim 10, wherein the first ear and the first microphone are located within a first region of the first acoustic beam, and wherein the second ear and the second microphone are located within a second region of the second acoustic beam.

12. The system of claim 10, wherein the first microphone is located outside a first region of the first acoustic beam, and wherein the second microphone is located outside a second region of the second acoustic beam.

13. The system of claim 10, wherein the first additional sound waves are distinct from the second additional sound waves.

14. A system for active noise cancellation, the system comprising:

at least one device for: from at least a first microphone, receiving first microphone signals that represent first sound waves; from at least a second microphone, receiving second microphone signals that represent second sound waves; in response to the first microphone signals, estimating first noise in the first sound waves, and outputting first cancellation signals for causing a speaker array to generate first additional sound waves via at least a first acoustic beam for cancelling at least some of the first noise; in response to the second microphone signals, estimating second noise in the second sound waves, and outputting second cancellation signals for causing the speaker array to generate second additional sound waves via at least a second acoustic beam for cancelling at least some of the second noise; receiving first audio signals from a first channel of an audio source; receiving second audio signals from a second channel of the audio source; combining the first audio signals into the first cancellation signals for causing the speaker array to generate the first additional sound waves via at least the first acoustic beam, so that the first additional sound waves also represent information of the first audio signals; and combining the second audio signals into the second cancellation signals for causing the speaker array to generate the second additional sound waves via at least the second acoustic beam, so that the second additional sound waves also represent information of the second audio signals.

15. A system for active noise cancellation, the system comprising:

at least one device for: from at least a first microphone located within a first environment around a first ear, receiving first microphone signals that represent first sound waves from the first environment; from at least a second microphone located within a second environment around a second ear, receiving second microphone signals that represent second sound waves from the second environment; from at least a third microphone located outside a first region of a first acoustic beam, receiving third microphone signals that represent third sound waves from outside the first region; from at least a fourth microphone located outside a second region of a second acoustic beam, receiving fourth microphone signals that represent fourth sound waves from outside the second region; in response to the first and third microphone signals, estimating first noise in the first and third sound waves, and outputting first cancellation signals for causing a speaker array to generate first additional sound waves via at least the first acoustic beam for cancelling at least some of the first noise, wherein the first ear and the first microphone are located within the first region of the first acoustic beam; and, in response to the second and fourth microphone signals, estimating second noise in the second and fourth sound waves, and outputting second cancellation signals for causing the speaker array to generate second additional sound waves via at least the second acoustic beam for cancelling at least some of the second noise, wherein the second ear and the second microphone are located within the second region of the second acoustic beam.

16. The system of claim 15, wherein the first additional sound waves are distinct from the second additional sound waves.

17. The system of claim 15, wherein the at least one device is for: receiving first audio signals from a first channel of an audio source; receiving second audio signals from a second channel of the audio source; combining the first audio signals into the first cancellation signals for causing the speaker array to generate the first additional sound waves via at least the first acoustic beam, so that the first additional sound waves also represent information of the first audio signals; and combining the second audio signals into the second cancellation signals for causing the speaker array to generate the second additional sound waves via at least the second acoustic beam, so that the second additional sound waves also represent information of the second audio signals.

18. The system of claim 15, wherein the speaker array is integral with a headboard of a bed.

* * * * *